(12) United States Patent
Melton

(10) Patent No.: US 11,756,119 B2
(45) Date of Patent: Sep. 12, 2023

(54) PRIORITY MATCHING FOR MAKER ORDERS EXHIBITING DELAYED CANCELATION

(71) Applicant: Hayden Paul Melton, Philadelphia, PA (US)

(72) Inventor: Hayden Paul Melton, Philadelphia, PA (US)

(73) Assignee: Refinitiv US Organization LLC, New York, NY (US)

( * ) Notice: Subject to any disclaimer, the term of this patent is extended or adjusted under 35 U.S.C. 154(b) by 546 days.

(21) Appl. No.: 15/430,829

(22) Filed: Feb. 13, 2017

(65) Prior Publication Data

US 2017/0236202 A1 Aug. 17, 2017

Related U.S. Application Data

(60) Provisional application No. 62/293,848, filed on Feb. 11, 2016.

(51) Int. Cl.
*G06Q 40/04* (2012.01)

(52) U.S. Cl.
CPC ................... *G06Q 40/04* (2013.01)

(58) Field of Classification Search
CPC ......... G06Q 40/04; G06Q 40/00; G06Q 40/06
USPC ...................................................... 705/30–40
See application file for complete search history.

(56) References Cited

U.S. PATENT DOCUMENTS

| | | | |
|---|---|---|---|
| 2008/0172321 A1 | 7/2008 | Bartko | |
| 2012/0072373 A1 | 3/2012 | Glinberg | |
| 2014/0358757 A1* | 12/2014 | Bartko | G06Q 40/06 705/37 |
| 2014/0372277 A1 | 12/2014 | Berkeley | |
| 2015/0127519 A1 | 5/2015 | Melton | |
| 2015/0356679 A1* | 12/2015 | Schmitt | G06Q 40/04 705/37 |
| 2016/0104242 A1 | 4/2016 | Melton | |
| 2016/0267593 A1 | 9/2016 | Melton | |
| 2017/0103457 A1* | 4/2017 | Acuña-Rohter | G06Q 40/04 |

\* cited by examiner

*Primary Examiner* — Edward Chang
(74) *Attorney, Agent, or Firm* — Sheppard Mullin Richter & Hampton LLP

(57) ABSTRACT

An electronic trading venue (ETV) may prioritize maker orders that specify or are associated with cancel delay values by selecting a maker order to be matched with taker orders before competing maker orders, at the same price level for a given instrument, that have smaller or no cancel delay values. Such prioritization may occur even if the competing maker orders were received before the maker order. A cancel delay value indicates an amount of time that must pass after a request to cancel a maker order is received before the ETV actually cancels the maker order. Thus, in exchange for prioritization, maker orders will be subject to a cancellation delay that starts after a cancel request is received and during which a maker order will not be canceled. Takers may benefit from this by being able to match with a maker order before it can be canceled.

28 Claims, 4 Drawing Sheets

PRIORITY MATCHING FOR MAKER ORDERS EXHIBITING DELAYED CANCELATION

CROSS-REFERENCE TO RELATED APPLICATIONS

This application claims priority to U.S. Provisional Patent Application No. 62/293,848, filed Feb. 11, 2016, entitled "PRIORITY MATCHING FOR MAKER ORDERS EXHIBITING DELAYED CANCELLATION," which is incorporated by reference in its entirety herein.

FIELD OF THE INVENTION

The invention relates to systems and methods for prioritizing a maker order with respect to other maker orders based on its cancel delay value (if provided), which indicate an amount of time that must pass after a request to cancel the maker order is received before the system cancels the maker order, and the cancel delay value of other maker orders.

BACKGROUND OF THE INVENTION

Conventional electronic trading venues ("ETVs") typically match maker orders (e.g., orders that specify an offer to buy or sell a financial instrument at a given price thereby making liquidity in a market) against taker orders (e.g., orders that are matched with previously submitted maker orders thereby taking the liquidity provided by the maker orders) using an approach that is often referred to as "price-time priority." In this approach to matching, a taker order is matched against existing maker orders on the ETV first by ranking those orders by price, and when price ties exist among those maker orders, breaking those ties by ranking same-priced orders by time of receipt. Put another way, a taker order is matched first with the most competitively priced maker order(s), and then when multiple maker orders exist at the same price level, matched with those received by the venue earlier before those received later.

The foregoing and other approaches to matching, however, can introduce the perception of unfairness to market participants due to the limitations of electronic communication systems and level of sophistication of the computer and network resources employed by some market participants, but not others. For example, due to network congestion, latency, and other problems, one market participant may be able to execute trades faster than another market participant. Even equally matched market participants (from a computer/network technology perspective) may suffer unfairness due to inherent network latencies that can exist across a diverse network such as the Internet. One example in which these problems are manifested is in races to cancel maker orders. In a race to cancel a maker order, a maker may cancel a maker order before a taker is able to have the ETV process a taker order due to the previously described network-based and other problems. Races to cancel maker orders may benefit the market in that makers may continue to provide much needed liquidity to the market, confident that they can cancel such orders if necessary. However, takers may perceive this behavior as unfairly disadvantageous to them. As such, what is needed is to discourage races to cancel trades while incentivizing makers to continue to supply liquidity in the form of maker orders. These and other problems exist with conventional ETV implementations.

SUMMARY OF THE INVENTION

The invention addressing these and other drawbacks relates to systems and methods for prioritizing maker orders that specify or are associated with cancel delay values by selecting a maker order to be matched with taker orders before other (competing) maker orders, at the same price level for a given instrument, that have smaller or no cancel delay values. Such prioritization may occur even if the competing maker orders were received before the maker order. To the extent there is a tie in cancel delay values among the maker orders (e.g., at the same price level), the system may use the time of receipt of the orders to break such tie. A cancel delay value indicates an amount of time that must pass after a request to cancel a maker order is received before the system actually cancels the maker order. Thus, in exchange for prioritization, maker orders will be subject to a cancellation delay that starts after a cancel request is received and during which a maker order will not be canceled.

The system may encourage market participants to submit maker orders with cancel delay values in order to improve the perception of fairness in an electronic trading venue for takers. Takers benefit because they may be able to match with a maker order before the maker order is able to be canceled (e.g., during the cancellation delay). The perception of such fairness may be undermined due to technical constraints of computer networks and in particular computer networks used by electronic trading venues (ETVs). For example, the system encourages an improved perception of fairness for takers by allowing their orders to be matched before maker orders can be canceled, thereby addressing issues with network latency and mitigating the advantage that sophisticated computer resources (employed by a market participant who is a maker) have in placing orders and cancels more quickly than counterpart computer resources (employed by a market participant who is a taker). Furthermore, for similar reasons, the system may mitigate algorithmic trades that can place cancel requests faster than takers can submit taker orders. At the same time, the system confers the previously noted benefit of prioritized matching for maker orders associated with cancel delay values.

To facilitate the foregoing and other features, an ETV may use explicit or implicit cancel delay values for maker orders. For explicit cancel delay values, the ETV may enable market participants to specify cancel delay values with their maker orders. For instance, the ETV may accept a maker order that specifies a cancel delay value. If the maker order is configured using a FIX message format, for example, a FIX tag for the cancel delay value may be used such that the value of the FIX tag specifies the cancel delay value. Thus, using a FIX message, a market participant may specify a cancel delay value within a FIX tag used for the cancel delay value. Other types of order formats may be used as well, and different methods of obtaining the cancel delay value from a market participant may be used.

In some implementations, the ETV may use implicit cancel delay values, which are cancel delay values that are not explicitly specified by a given maker order (e.g., a FIX tag in a maker order configured as a FIX format message does not specify a cancel delay value). For example, for certain market participants, the ETV may store an implicit cancel delay value for orders originating from those market participants. As such, when a maker order from a market participant is received, and the maker order does not specify a cancel delay value, the ETV may obtain an identity of the market participant, obtain any implicit cancel delay value associated with the market participant, and apply the implicit cancel delay value with the received maker order.

In some implementations, the ETV may prioritize a maker order based on a cancel delay value, but not impose the cancel delay on a cancel request for the maker order. For example, recognizing that "manual traders" (i.e., non-algorithmic human traders) have response times of over 100 ms, compared to algorithms whose response times can be less than 1 ms, the ETV may consider those manual orders to have a fixed cancel delay value and treat them as such with respect to matching, but not necessarily as such with respect to cancellation. Such fixed cancel delay value may be predefined by the ETV at a particular value, such as 100 ms. In this manner, the ETV may not subject a cancel request on a maker order submitted by a manual trader to any delay at all, but may give that maker order a priority for matching as if it were submitted with the fixed cancel delay value. The ETV may apply such fixed cancel delay value on other orders as well, such as to those orders from market participants who are geographically distant from the venue.

In some implementations, to reduce operational complexity for the ETV (and market participants that use explicit cancel delay values), the ETV may support only a certain number of cancel delay values (e.g., the cancel delay values must be selected from a list of supported cancel delay values). Such values may be referenced by a mnemonic indicator (e.g., "short" as the mnemonic for 3 milliseconds (ms), and "long" as the mnemonic for 100 ms—although more than two such values may be used and other types of mnemonic indicators may be used).

In some implementations, the ETV may receive new order messages and cancel request messages via a computer network. For example, an order gateway, such as a FIX gateway, may receive the messages at a network device such as a TCP/IP socket that is part of the ETV. The socket (or the component containing it) may route a message to an appropriate queue depending on whether it is a cancel request message or a new order message. A cancel request message may be routed to a cancel request queue, and new order messages may be routed to a new orders queue. Upon receipt of a message, and before it is inserted into an appropriate queue, the ETV may associate the message with a time of receipt of the message. For example, the ETV may insert "inline" into the message the time at which the cancel request was received.

To process cancel requests and prioritize maker orders having cancel delay values, the ETV may process the cancel request and new orders queues. For example, the ETV may employ a polling threat to process the queues. If the cancel request queue is not empty, then the ETV may iterate over all cancel request messages in it. For each such cancel request message, the corresponding order in the may be looked up (e.g., by comparing an order identification value specified in the cancel request message to previously submitted orders). Upon reconciling a cancel request message with its maker order, the value of the cancel delay value may be obtained based on the maker order. For example, the ETV may obtain the cancel delay value based on a FIX tag in the maker order for explicit cancel delay values, or obtain an implicit cancel delay value if none is specified (or default to a default cancel delay value such as zero). If the current time is greater than or equal to the sum of the time of receipt of the cancel request message and the duration of time specified by the cancel delay value associated with the maker order, then the cancel request message is removed from the cancel request queue, and the maker order is removed from the Limit Order Book (i.e., the maker order is canceled). Otherwise the maker order remains in the Limit Order Book, and the cancel request message remains in the cancel request queue.

The ETV may then obtain the next new order from the new orders queue, which may be sorted by time of receipt of new orders such that new orders received first are processed first. The new order is then processed against the Limit Order Book by either matching it with an existing bid or offer, canceling it if it is an immediate-or-cancel (IOC) order that can't be immediately matched, or by inserting it into the Limit Order Book. If the new order is inserted into the Limit Order Book, and other competing orders exist at its same price level having its same side (i.e., buy or sell) then the position in the queue of such orders in the Limit Order Book may be determined by examining the tag containing its delay (implicit or explicit) and comparing the value in that tag to the "cancel delay" value (implicit or explicit) of the other orders in the queue. The new order will then be inserted into the Limit Order Book in "front" of any other such maker orders in that queue with smaller values for their cancellation delay, but behind any such orders with an equal or higher delay value. For the avoidance of doubt, orders nearer the front of the queue at a price level are matched before those nearer the back of the queue at that same price level. Once the processing of the new order message is completed as set forth above, the ETV may process the cancel request messages in the cancel request queue to repeat the processing.

DETAILED DESCRIPTION OF THE INVENTION

Figure 1:
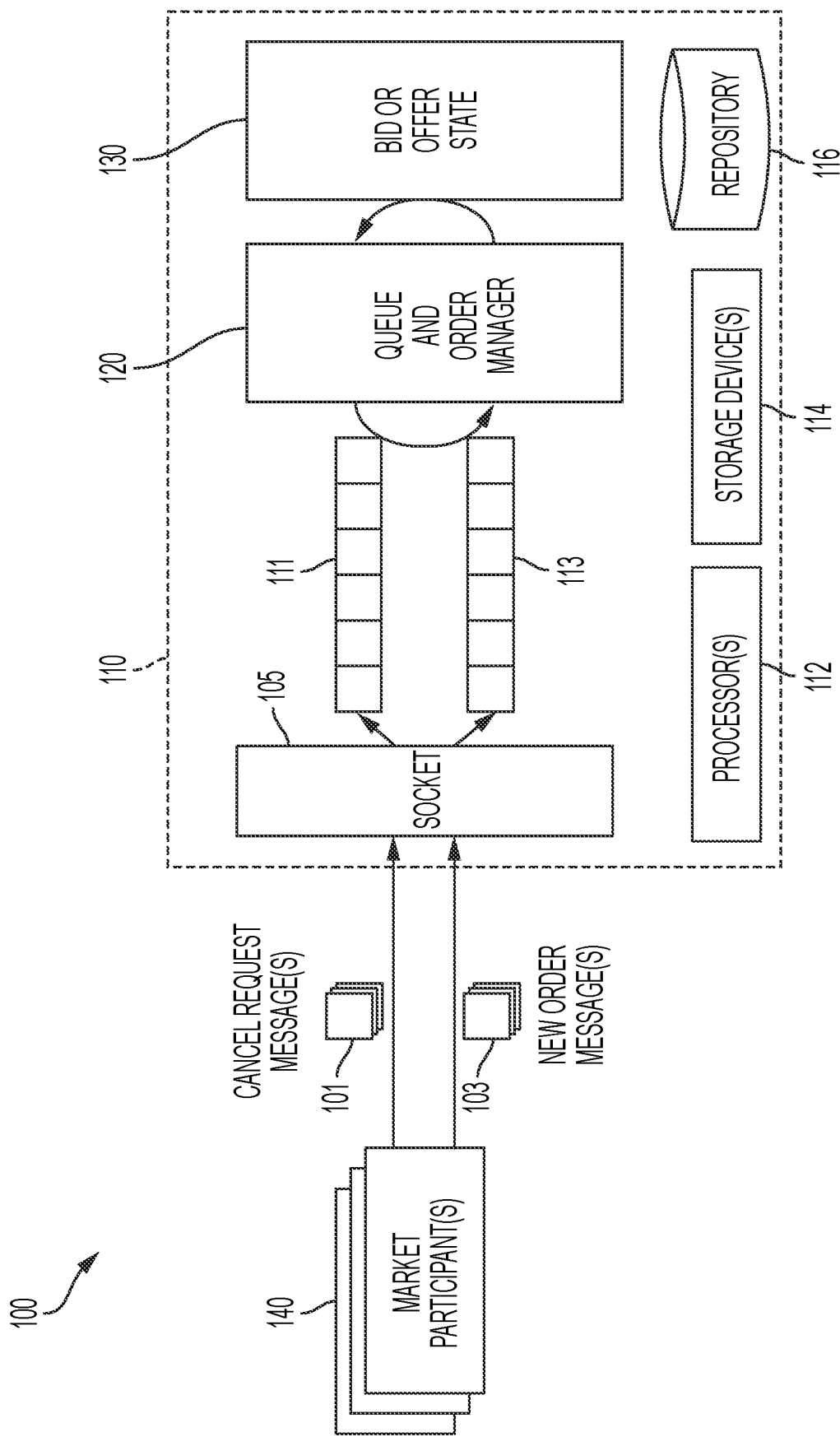
FIG. 1 illustrates an exemplary system for prioritizing orders based on cancel delay values, according to an implementation of the invention.

The invention described herein relates to a system and method for prioritizing maker orders based on their respective cancel delay values. A cancel delay value indicates an amount of time that must pass after a request to cancel the maker order is received before the system cancels the maker order. A market participant may specify the cancel delay value—or not specify any cancel delay value—in its maker order. As such, a maker order may or may not specify a cancel delay value and one maker order may have a different cancel delay value than another maker order. While including a cancel delay value in a maker order will make canceling the maker order more difficult from the perspective of a market participant, the market participant will obtain certain benefits of submitting a maker order having a cancel delay value.

For example, the system may encourage market participants to submit maker orders with cancel delay values by prioritizing maker orders having larger cancel delay values over other maker orders, at the same price level for a relevant instrument, having smaller cancel delay values. A maker order is prioritized with respect to other (competing) maker orders by being matched with a taker order ahead of competing maker orders at the same price level. Thus, a first market participant may have its maker order fulfilled sooner than a competing maker order at the same price level if the competing maker order has a smaller cancel delay value. In this manner, the system incentivizes submission of maker orders that specify a cancel delay value, and incentivizes larger cancel delay values over smaller ones.

A maker order "competes" with another maker order if they are for the same instrument, the same price, and the same side of the transaction (buy or sell). For instance, a first maker order may include an offer to sell an instrument at price X. A second (competing) maker order may also include an offer to sell the instrument at price X. Thus, the first maker order and the second maker order compete to sell the instrument at price X. A taker order for buying the instrument may be matched to the first or the second maker order based on the prioritization described herein. Likewise, a third maker order may include an offer to buy an instrument at price Y. A fourth (competing) maker order may also include an offer to buy the instrument at price Y. Thus, the third maker order and the fourth maker order compete to buy the instrument at price Y. A taker order for selling the instrument may be matched to the third or the fourth maker order based on the prioritization described herein. It should be noted that in either of the above scenarios, the quantity of the number of shares or units to be transacted may differ among competing orders.

The system may encourage maker orders that specify cancel delay values in order to promote an improved perception of fairness in an electronic trading venue for both takers and makers. Such a perception of fairness may be undermined due to technical constraints of computer networks and in particular computer networks used by ETVs. For example, the system encourages fairness by allowing taker order to be fulfilled before maker orders can be canceled, thereby addressing issues with network latency and mitigating the advantage that sophisticated computer resources (employed by a market participant) have in placing orders and cancels more quickly than counterpart computer resources (employed by a competing market participant). Furthermore, for similar reasons, the system may mitigate algorithmic trades that can place cancel requests faster than takers can submit taker orders. At the same time, the system confers the previously noted benefit of prioritized matching for maker orders with cancel delay values.

Exemplary System Architecture

FIG. 1 illustrates an exemplary system 100 for prioritizing orders based on cancel delay values, according to an implementation of the invention. System 100 may include an ETV 110 and one or more market participants 140, and/or other components.

As described herein throughout, the term "market participant" (or simply "participant") is intended to be broadly construed to refer to any entity that receives (through a computing device) market data from the venue, or sends (through a computing device) order-related messages to the venue, including, but not limited to: a firm that conducts business on the electronic trading venue, a credit entity associated with such a firm (a single firm may have a plurality of credit entities), or a user (human or otherwise).

ETV 110 may be configured as a computer system that includes a socket 105, one or more processors 112 (also interchangeably referred to herein as processors 112, processor(s) 112, or processor 112 for convenience), one or more storage devices 114 (which may store various instructions that program processors 112), and/or other components, such as those illustrated in U.S. patent application Ser. No. 14/533,543, entitled "IDEAL LATENCY FLOOR," filed on Nov. 5, 2014; U.S. patent application Ser. No. 14/930,499, entitled "SYSTEMS AND METHODS FOR QUANTIFYING TEMPORAL FAIRNESS ON ELECTRONIC TRADING VENUES" filed on Nov. 2, 2015; and U.S. patent application Ser. No. 15/064,163, entitled "SYSTEMS AND METHODS FOR OBTAINING AND EXECUTING COMPUTER CODE SPECIFIED BY CODE ORDERS IN AN ELECTRONIC TRADING VENUE" filed on Mar. 8, 2016, which are all incorporated by reference in their entireties herein.

Socket 105 may include a network component such as, without limitation, a TCP/IP socket, although other types of network components may be used as well. Although not illustrated, socket 105 may be a component of an order gateway component (not illustrated) of the ETV 110. Such order gateway component may be configured as a Financial Information eXchange ("FIX") gateway that receives FIX protocol messages from market participants. The FIX protocol messages may specify cancel request messages 101, order messages 103, and/or other messages. For orders that include a cancel delay value, such value may be encoded as and parsed (e.g., read) from a key-value pair within the FIX protocol message. Other types of order gateway components and message protocols may be used as well.

Processors 112 may be programmed by one or more computer program instructions. The computer program instructions may include, without limitation, a queue and order manager 120 and/or other instructions that program ETV 110 to perform various operations, which are described in greater detail herein. As used herein, for convenience, the various instructions will be described as performing an operation, when, in fact, the various instructions program the processors 112 (and ETV 110) to perform the operation. Alternatively or additionally, any one of the foregoing components of ETV 110 stored at storage device 114 may include hardware, including specialized networking hardware configured to receive and process code orders.

ETV 110 may maintain a bid or offer state 130, which may track a bid or offer state for the instruments that trade on them. A bid or offer state is indicative of bids and/or offers with respect to the instrument. One example of a bid or offer state is the state of a central limit order book ("CLOB"), although other types of mechanisms may be used to track bid or offer states. The term "CLOB" is used by example and not limitation. Other ways to maintain a bid or offer state may be used as well so as aggregate supply and demand, perform matching, organize orders, etc., on a given instrument or group of instruments. Point-in-time "snapshots" of bid or offer states are distributed from the ETV to market participants as market data updates. Such updates may also include additional information that, depending on one's viewpoint may or may not be considered part of the bid or offer state, such as the price and quantity of the last trade that occurred on an instrument.

Adding Messages From Market Participants to Appropriate Queues

Figure 3:
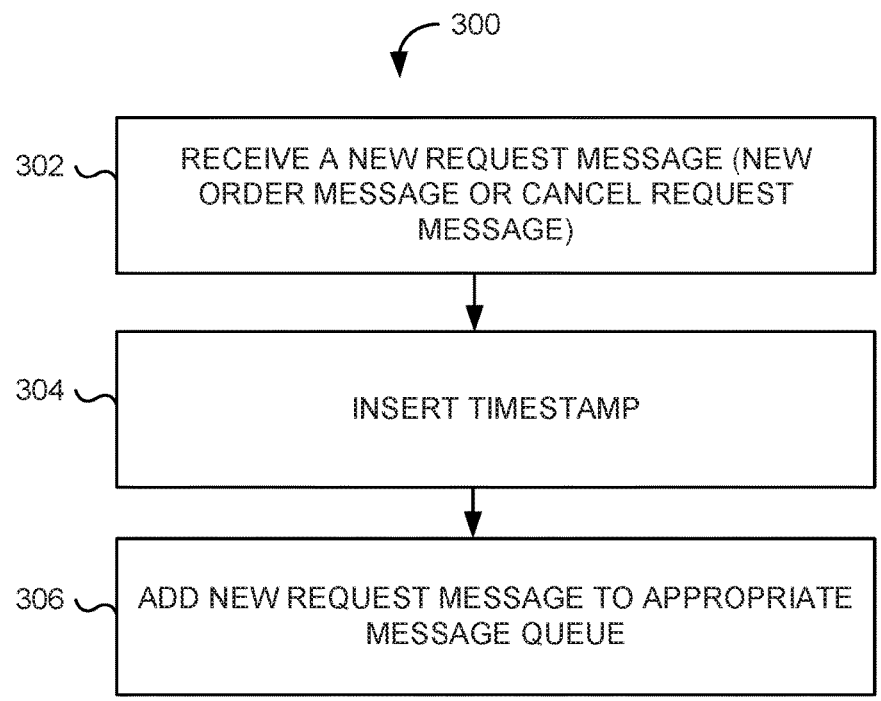
FIG. 3 depicts a process for receiving new messages from market participants and adding the messages to an appropriate message queue for processing and prioritization, according to an implementation of the invention.

FIG. 3 depicts a process 300 for receiving new messages from market participants 140 and adding the messages to an appropriate message queue for processing and prioritization, according to an implementation of the invention.

In an operation 302, process 300 may include receiving a new message from a market participant 140. For example, socket 105 may receive a new message from a market participant 140 via a network using a network protocol like TCP/IP. The new message may be configured as a FIX message using a FIX message format and/or other type of message using other types of message formats. A given FIX message may encode, as a key-value pair, a type of message (e.g., whether the message conveys a maker order, a cancel request message, a taker order, etc.). Examples herein throughout will be and have been described with respect to FIX messages for convenience and not limitation, as other types of messages may be used.

A given FIX message may also encode, using a key-value pair, a cancel delay value. In some implementations, an ETV 110 may permit any value to be specified for the cancel delay value. Alternatively, in some implementations, to reduce operational complexity for both ETV 110 and market participants 140, ETV 110 may support only a certain number of cancel delay values (e.g., the cancel delay values must be selected from a list of supported cancel delay values). Such values may be referenced by a mnemonic indicator (e.g., "short" as the mnemonic for 3 milliseconds (ms), and "long" as the mnemonic for 100 ms—although more than two such values may be used and other types of mnemonic indicators may be used).

In some implementations, ETV 110 may permit any cancel delay value up to a maximum, such as 250 ms, although other maximum cancel delay value may be set by the venue. Further still, in some implementations, particularly on venues implementing a minimum quote life ("MQL") for maker quotes, the operator may implement the mechanism such that cancel requests received within the minimum quote life are rejected, therefore ensuring that the minimum delay period can only extend (and not shorten) MQL.

In some implementations, in addition to a zero (or absent delay value) a minimum delay value may be enforced by the venue, and this value may be set to the length of the Ideal Latency Floor deployed on the venue, which may be determined as disclosed in U.S. patent application Ser. No. 14/533,543, which was incorporated by reference in its entirety herein.

In some implementations, ETV 110 may prioritize a maker order based on a cancel delay value, but not impose the cancel delay on a cancel request for the maker order. For example, recognizing that "manual traders" (i.e., non-algorithmic human traders) have response times of over 100 milliseconds, compared to algorithms whose response times can be less than 1 millisecond, may consider those manual orders to have a fixed cancel delay value and treat them as such with respect to matching, but not necessarily as such with respect to cancellation. Such fixed cancel delay value may be predefined by the ETV 100 at a particular value, such as 100 ms. In this manner, ETV 100 may not subject a cancel request on a maker order submitted by a manual trader to any delay at all, but may give that maker order a priority for matching as if it were submitted with say the fixed cancel delay value. ETV 100 may apply such fixed cancel delay value on other orders as well, such as to those orders from market participants who are geographically distant from the venue.

In an operation 304, process 300 may include associating the new message with a time of receipt of the new message. For instance, socket 105 may insert a current time when the new message is received at the socket into the new message, or otherwise store the current time in association with the new message.

In an operation 306, process 300 may include adding the new message to an appropriate queue. For instance, socket 105 may identify a type of the new message through examination of its payload (e.g., by parsing a value of the 'MsgType' tag in the FIX protocol). Once the socket 105 identifies the type of the new message, it may add the message to the appropriate queue based on the time of recipe of the new message. For example, socket 105 may add a cancel request message to a cancel request queue 111 such that cancel requests in the cancel request queue are ordered according to their times of receipt (in which a given cancel request received earlier than another cancel request is processed earlier than the other cancel request). Likewise, socket 105 may add new orders to a new orders queue 113 ordered according to their times of receipt in a similar manner.

Processing the Queues to Prioritize Orders

ETV 110 may prioritize orders based on cancel delay values they specify (or do not specify). To do so, in some implementations, ETV 110 may process the new orders queue 113 and the cancel request queue 111. For example, queue and order manager 120 may process the queues periodically based on one or more triggers, such as a predefined amount of time having elapsed since a prior queue processing occurred, a new order having been received and added to a queue, and/or other triggers.

In some implementations, queue and order manager 120 may process the queues by implementing a polling thread using a high-level language such as Java™, using standard classes from the Java API such as Thread, Socket, String, TreeMap, LinkedList and so on. For example, queue and order manager 120 may iterate through each cancel request message in the cancel request queue 111 (if the queue is not empty) to determine whether or not a corresponding order in limit order book 130 should be removed (and whether or not the relevant cancel request message should be removed from the cancel request queue itself). Queue and order manager 120 may then iterate through the new orders queue 113 to fill or cancel new orders that are immediate-or-cancel new orders (e.g., a taker order) or by placing new orders that are maker orders in the limit order book 130, prioritized based on whether or not they specify cancel delay values and the size of the cancel delay values.

It is to be appreciated although the scheme for processing queues is described with respect to a polling thread and two queues, queue and order manager 120 may employ other data structures, threading patterns, techniques and so on for the purposes of determining whether or not a message should be canceled and whether and how to prioritize a maker order that specifies a cancel delay value. Having described a high level overview of processing cancel request and new orders queues, attention will now be turned to a more detailed discussion of various processes ETV 110 may employ to process the queues.

Iterating through a Cancel Request Queue

Figure 2:
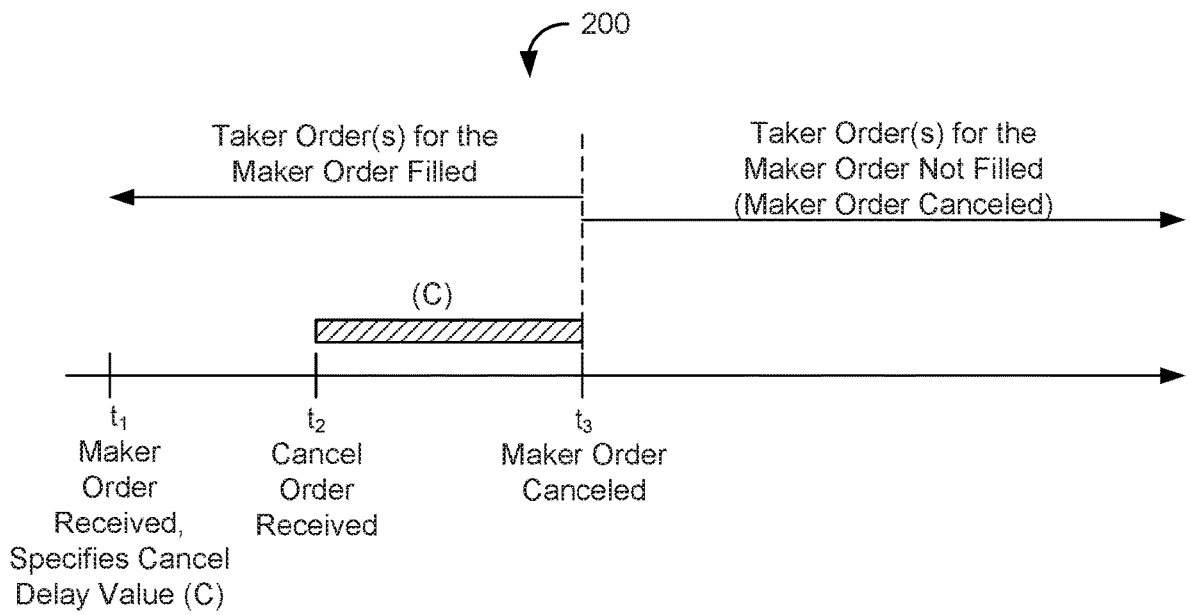
FIG. 2 depicts a schematic diagram of the timing for canceling an order based on a cancel delay value specified in the order and a time of receipt of a request to cancel the order, according to an implementation of the invention.

Referring back to FIG. 2, which depicts a schematic diagram 200 of the timing for canceling an order based on a cancel delay value specified in the order and a time of receipt of a request to cancel the order, a maker order may be received at time $t_1$. The maker order specifies (or is associated with) a cancel delay value (C). At time $t_2$, a cancel request is received. The cancel request specifies that a particular maker order should be canceled. For example, the cancel request may specify an order identifier that identifies the maker order to be canceled. At time $t_3$, which is the time at which the cancel request was received ($t_2$) plus the cancel delay value (C), ETV 100 will consider the maker order to be canceled. For example, on or after $t_3$, ETV 100 may remove the maker order from the bid or offer state 130. As such, before $t_3$, takers orders at the same price level will be matched with respect to the maker order. After $t_3$, taker orders at the same price level will not be matched with the (now canceled) maker order.

Figure 4:
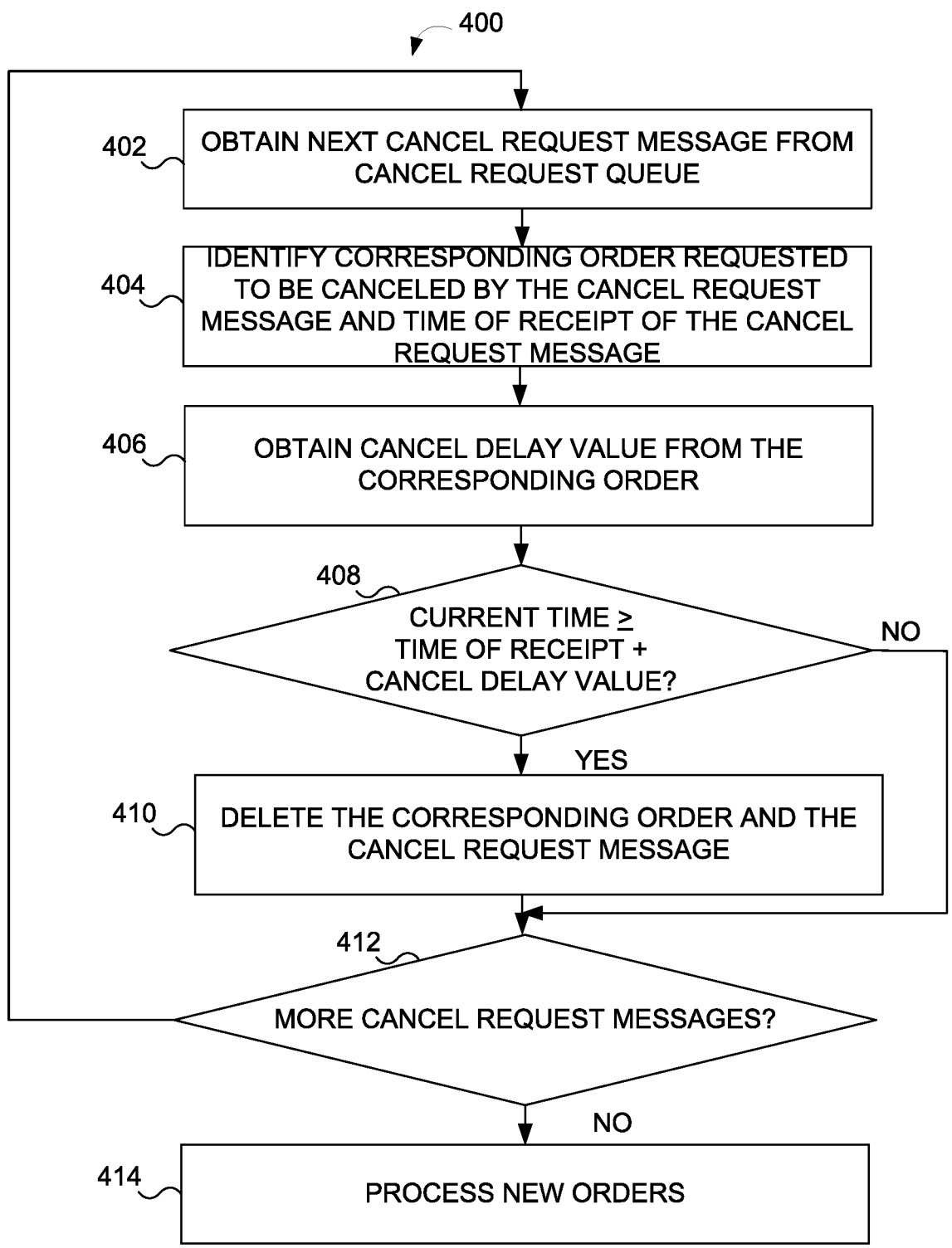
FIG. 4 depicts a process for iterating through a cancel request queue to process cancel requests, according to an implementation of the invention.

FIG. 4 depicts a process 400 for iterating through a cancel request queue to process cancel requests, according to an implementation of the invention. In an operation 402, process 400 may include obtaining the next cancel request message to be processed from the cancel request queue 111. The next cancel request message may be obtained based on the time of receipt of each of the cancel request messages. For example, as previously disclosed, a cancel request message may be added to the cancel request queue 111 based on its time of receipt. In this manner, the cancel request queue 111 may be ordered based on respective time of receipt of each of the cancel request messages. In connection with obtaining the next cancel request message in the queue, process 400 may obtain the time of receipt of the cancel request message.

In an operation 404, process 400 may include identifying a corresponding order that is requested to be canceled by the next cancel request message. For example, queue and order manager 120 may obtain an order identifier specified by the cancel request message. In the context of a FIX message format, queue and order manager 120 may obtain a 'OrigClOrdld' value specified by the cancel request message and compare the value to 'ClOrdld' values of orders from the same FIX session in the limit order book 130.

In an operation 406, process 400 may include obtaining the cancel delay value based on the corresponding order, which was identified in operation 404. Continuing the example of a FIX message, upon reconciling a cancel request message with its maker order, the value of the FIX tag containing the cancel delay value may be obtained from a FIX tag in the maker order. Alternatively, an implicit delay value may be obtained, which may be based on an identification of the market participant that submitted the corresponding maker order. For example, a market participant known as a "manual" trader may be assigned with an implicit delay value.

In some instances, market participants (or the operator of the ETV) may specify that their orders be associated with implicit cancel delay values. Such information may be received from the market participant and stored as a market participant profile by the ETV 110 in a database such as a repository 116. In some instances, the market participant profile may specify that all orders from the given market participant be assigned with an implicit delay value. In some instances, the market participant profile may specify that certain orders (e.g., relating to certain financial instruments, price, etc.) should be assigned with an implicit delay value, while other orders should not.

In an operation 408, process 400 may include determining whether the current time is greater than or equal to the time of receipt of the cancel request message plus the cancel delay value specified in the corresponding maker order.

In an operation 410, process 400 may include, responsive to a determination that the current time is greater than or equal to the time of receipt of the cancel request message plus the cancel delay value specified in the corresponding maker order (i.e., that an amount of time specified by the cancel delay value since receipt of cancel delay value has elapsed), deleting the corresponding maker order from the limit order book 130 and deleting the cancel request message from the cancel request queue 111 (i.e., execute the cancel request and cancel the corresponding maker order). On the other hand, responsive to a determination that the current time is less than the time of receipt of the cancel request message plus the cancel delay value specified in the corresponding maker order, process 400 may proceed to operation 412 without performing operation 410 (i.e., retain the cancel request message for later processing, and do not cancel the corresponding maker order).

In operation 412, process 400 may include determining whether more cancel request messages exist in the cancel request queue 111. If so, process 400 may return to operation 402 and obtain the next cancel request message to be processed. If not, in an operation 414, process 400 may proceed to process the new orders queue 113, as disclosed with respect to FIG. 5.

Iterating through a New Orders Queue

Figure 5:
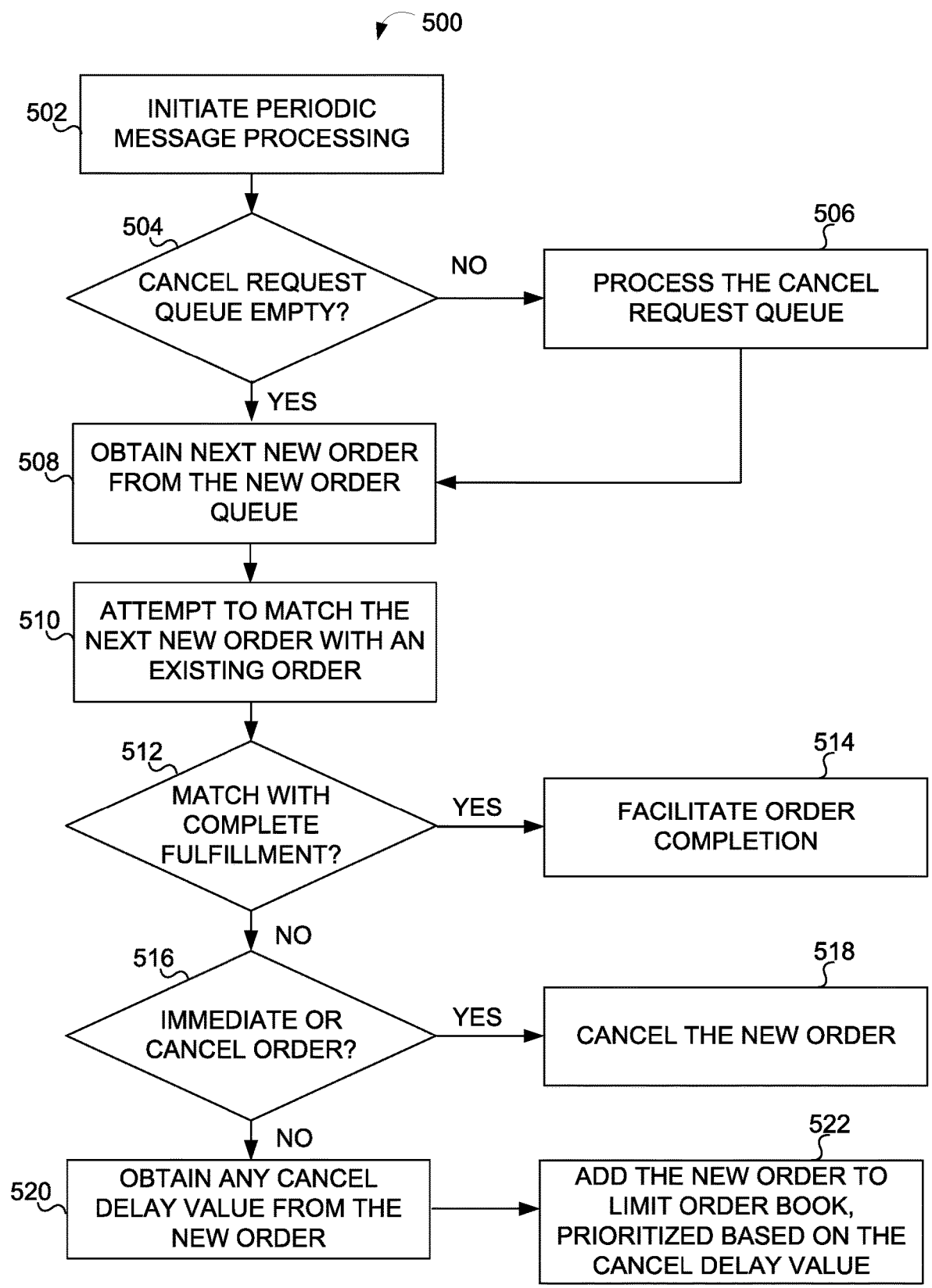
FIG. 5 depicts a process for iterating through a new orders queue and prioritizing orders based on their respective cancel delay values, according to an implementation of the invention.

FIG. 5 depicts a process 500 for iterating through the new orders queue 113 and prioritizing orders based on their respective cancel delay values, according to an implementation of the invention.

In an operation 502, process 500 may include initiating periodic message processing. For example, after the cancel request queue is processed, process 500 may be triggered and include obtaining the next new order message from the new orders queue 113 in operation 502. The next new order message to be processed may be obtained based on the time of receipt of each of the cancel request messages. For example, as previously disclosed, a new order message may be added to the new orders queue 113 based on its time of receipt. In this manner, the new orders queue 113, like the cancel request queue 111, may be ordered based on respective time of receipt of each of the new order messages. In connection with obtaining the next cancel request message in the queue, process 500 may obtain the time of receipt of the new order message.

In an operation 504, process 500 may include determining whether the cancel request queue is empty. For example, after processing the cancel request queue (or during), additional cancel request messages may have been received. Responsive to a determination that the cancel request queue is not empty, process 500 may include processing the cancel request queue in an operation 506. The cancel request queue may be processed using process 400 illustrated in FIG. 4. On the other hand, responsive to a determination that the cancel request queue is empty, in an operation 508, process 500 may include obtaining the next new order from the new order queue.

In an operation 510, process 500 may include attempting to match the next new order (e.g., a buy order) with an existing order (e.g., a sell order). Such existing order may be prioritized with respect to other existing orders for matching based on its cancel delay value (if any) and other existing orders' cancel delay values. Such matching may include processing the new order message against the limit order book 130. For example, queue and order manager 120 may attempt to match an order specified by the new order message with existing orders in the limit order book 130 at the same price level. In a particular example, the order specified by the new order message may specify to buy 1,000 shares of financial instrument X at $50 per share. Queue and order manager 120 may attempt to match the order with existing orders to sell financial instrument X. During the matching process, existing orders will be prioritized for matching based on their respective cancel delay values (if so specified by the orders) at the same price level. Thus, an existing order to sell ("Order A") having a cancel delay value of 200 ms will be priority-matched with the new order to buy over another existing order to sell having a cancel delay value of 50 ms ("Order B"). In other words, Order A will be filled first even if Order B was received beforehand. It should be noted that if Order A specified a quantity of 500 shares, then at least part of the Order B (or the next order in line based on its cancel delay value) may be filled to at least partially complete the 1,000 share order to buy. It should further be noted that in the foregoing example (and continued examples that follow), the new order may be an order to sell financial instrument X at a particular price level and the existing order(s) may be orders to buy.

In an operation 512, process 500 may include determining whether a match has occurred and whether the new order is able to be completely fulfilled based on the matching (e.g., continuing the foregoing example all 1,000 shares of financial instrument X are available to be purchased at $50 per share).

In an operation 514, process 500 may include, responsive to a determination that the new order is able to be completely fulfilled, facilitating order completion. Such completion may be performed using conventional ETV buy/sell services.

In an operation 516, process 500 may include, responsive to a determination that the new order is unable to be completely fulfilled, determine whether the new order is an immediate-or-cancel order (i.e., a type of order that must be filled completely or canceled). If the new order is an immediate-or-cancel order, then the new order is canceled (without completing any portion of the transaction) in an operation 518. If the new order is not an immediate-or-cancel order, then in an operation 520, process 500 may include fulfilling any portion of the new order that has matched with existing order(s), and obtaining any cancel delay value from the new order message.

In an operation 522, process 500 may include adding the new order (i.e., any unfulfilled number of shares—whether 1,000 or less—to buy at the $50 price level in the foregoing example) to the limit order book 130 based on the cancel delay value. For example, continuing the foregoing example, if existing orders to buy at the $50 price level are present in limit order book 130 for financial instrument X, then the new order will be added to the limit order book in a prioritized order according to its cancel delay value and the cancel delay value of the existing orders (typically, this will occur when no orders to sell at that price level exist in the limit order book 130). In this way, the new order becomes part of the existing orders in the limit order book 130, and a given existing order is matched before another existing order according to its position in the limit order book 130 for financial instrument X at the $50 price level. To be clear, the position of the existing orders with respect to one another is based on their respective cancel delay values such that the existing order with the largest cancel delay value will be matched first. To the extent there is a tie in cancel delay values, the ETV 110 may use the time of receipt of relevant orders to break such tie.

It should be noted that process 300 may be ongoing as processes 400 and 500 proceed. In other words, new messages (whether cancel request messages 101 or new order messages 103) may be received while the cancel request queue 111 and new orders queue 113 are processed according to processes 400 and 500.

According to various aspects of the invention, a system may receive a maker order that specifies (or does not specify) a cancel delay value. The system may receive a cancel request message that requests to cancel the previously submitted maker order and add the cancel request message to a cancel request queue. If a request to cancel the maker order is received, the system will cancel the maker order only if the time elapsed since receiving the cancel request meets or exceeds the amount of time specified by the cancel delay value included with the original maker order. Thus, the cancel delay value is specified in a maker order and a determination of whether the time specified by the cancel delay value has elapsed is based on a time of receipt of a cancel request message that requests to cancel the maker order.

ETV 110 may include a plurality of individual components (e.g., computer devices) each programmed with at least some of the functions described herein. In this manner, some components of ETV 110 may perform some functions while other components may perform other functions, as would be appreciated. The one or more processors 112 may each include one or more physical processors that are programmed by computer program instructions. The various instructions described herein are exemplary only. Other configurations and numbers of instructions may be used, so long as the processor(s) 112 are programmed to perform the functions described herein. ETV 110 may include other components not illustrated, such as the ETVs described in U.S. patent application Ser. Nos. 14/533,543, 14/930,499, and 15/064,163, the contents of which were previously incorporated by reference herein.

Furthermore, it should be appreciated that although the various instructions are illustrated in FIG. 1 as being co-located within a single processing unit, in implementations in which processor(s) 112 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein may be stored in a storage device 114, which may comprise random access memory (RAM), read only memory (ROM), and/or other memory. The storage device may store the computer program instructions (e.g., the aforementioned instructions) to be executed by processor 112 as well as data that may be manipulated by processor 112. The storage device may comprise floppy disks, hard disks, optical disks, tapes, or other storage media for storing computer-executable instructions and/or data.

Information used by system 100 (e.g., cancel request messages 101, order messages 103), including various queues may be stored in one or more repositories (not illustrated) accessible to the system. Such repositories and other databases described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The repositories may comprise one or more such databases that reside in one or more physical devices and in one or more physical locations, as well as online "cloud" storage implementations.

The various components illustrated in FIG. 1 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

The described operations of FIG. 3 and other process diagrams may be accomplished using some or all of the system components described in detail above. As such, although a given component may be described as performing a particular operation, such description is for illustration and not limitation. Furthermore, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated and described are exemplary by nature and, as such, should not be viewed as limiting.

Other implementations, uses and advantages of the invention will be apparent to those skilled in the art from consideration of the specification and practice of the invention disclosed herein. As used herein throughout, the term "exemplary" is intended to mean "example of." The specification should be considered exemplary only, and the scope of the invention is accordingly intended to be limited only by the following claims.

What is claimed is:

1. A computer-implemented method of maker orders including cancel delay values for execution on an Electronic Trading Venue (ETV), wherein the cancel delay values prevent cancellation of maker orders for a defined time period such that particular maker orders submitted by market participants with network connections with the ETV of a first speed may not be cancelled before completion of a matching operation with taker orders submitted by market participants with network connections with the ETV of a second speed slower than the first speed, and maker orders with cancel delay values of a first value are prioritized over maker orders with cancel delay values of a second value less than the first value to incentivize the use of the larger cancel delay values and increase the fairness and systemic efficiency of the ETV, the method being implemented by a computer system having one or more physical processors programmed with computer program instructions that, when executed by the one or more physical processors, program the computer system to perform the method, the method comprising:

storing, by the computer system, a first implicit cancel delay value associated with a first market participant;
receiving, by the computer system, a plurality of messages from market participants;
adding, by the computer system, a timestamp to individual messages of the plurality of messages indicating a time of receipt of the individual messages by the ETV;
analyzing, by the computer system, the payload of the individual messages of the plurality of messages and classifying, based on their payload, the individual messages as a maker order, a taker order, or a cancel request message;
adding, by the computer system, maker orders to a maker order queue, taker orders to a taker order queue, and cancel requests to a cancel request queue, the maker orders comprising a first maker order sent by the first market participant comprising an order to buy or sell an instrument at a price level and a second maker order sent by a second market participant comprising an order to buy or sell the instrument at the price level;
ordering, by the computer system, the maker order queue, taker order queue, and cancel request queue by the time of receipt by the ETV of the maker orders, taker orders, and cancel requests, respectively;
determining, by the computer system, whether the first maker order includes a first explicit cancel delay value;
obtaining, based on the determination that the first maker order does not include a first explicit cancel delay value, the first implicit cancel delay value, and associating the first implicit cancel delay value to the first maker order, the first implicit cancel delay value comprising a first amount of time that must pass from the receipt, by the ETV, of a request to cancel the first maker order during which the ETV is prevented from canceling the first maker order;
obtaining, by the computer system from the cancel request queue, a first cancel request from the first market participant that requests cancellation of the first maker order for the instrument;
identifying, by the computer system, the first maker order as corresponding to the first cancel request and, in response, obtaining a current time;
determining, by the computer system, that the first amount of time in the first implicit cancel delay value has not passed by comparing the first implicit cancel delay value with the amount of time that has passed between the current time and the time stamp added to the first cancel request indicating the time of receipt of the first cancel request by the ETV;
preventing, by the computer system and in response to the determination that the first amount of time in the first implicit cancel delay value has not passed, the first maker order from being cancelled at the current time;
obtaining, by the computer system, a second cancel delay value associated with the second maker order by the second market participant, the second cancel delay value comprising a second amount of time that must pass from the receipt, by the ETV, of a request to cancel the second maker order during which the ETV is prevented from canceling the second maker order, the second amount of time being different than the first amount of time of the first cancel delay value associated with the first maker order;
determining, by the computer system, that the second cancel delay value is larger than the first implicit cancel delay value;
ranking, by the computer system and in response to the determination that the second cancel delay value is larger than the first implicit cancel delay value, the second maker order ahead of the first maker order;

obtaining, by the computer system from the taker order queue, a taker order for the instrument; and selecting, by the computer system and in response to the ranking of the second maker order ahead for the first maker order, the second maker order to be matched with the taker order for execution despite the ordering of the first and second maker orders in the maker order queue.

2. The method of claim 1, wherein a cancel delay value of a maker order comprises one of a set of permissible cancel delay values predefined by the ETV and the messages received by the computer system further comprise a third maker order from a third market participant, the method further comprising:

obtaining, by the computer system, a third cancel delay value associated with the third maker order by the third market participant, the third cancel delay value comprising a third amount of time that must pass from the receipt, by the ETV, of a request to cancel the third maker order during which the ETV is prevented from canceling the third maker order, wherein the third cancel delay value is set by the third market participant before the third maker order is received by the ETV;

determining, by the computer system, that the third cancel delay value is not one of the predefined set of permissible cancel delay values; and rejecting, by the computer system, the third maker order based on the third cancel delay value not being one of the predefined set of permissible cancel delay values.

3. The method of claim 1, wherein a cancel delay value of a maker order comprises values below a maximum cancel delay value predefined by the ETV and the messages received by the computer system further comprise a third maker order from a third market participant, the method further comprising:

obtaining, by the computer system, a third cancel delay value associated with the third maker order by the third market participant, the third cancel delay value comprising a third amount of time that must pass from the receipt, by the ETV, of a request to cancel the third maker order during which the ETV is prevented from canceling the third maker order, wherein the third cancel delay value is set by the third market participant before the third maker order is received by the ETV;

determining, by the computer system, that the third cancel delay value exceeds the predefined maximum cancel delay value; and rejecting, by the computer system, the third maker order based on the third cancel delay value not being below the predefined maximum cancel delay value.

4. The method of claim 1, wherein the maker orders in the maker order queue further comprise a third maker order from a third market participant comprising an order to buy or sell the instrument at the price level, the third maker order received by the ETV after the second market order, the method further comprising:

obtaining, by the computer system, a third cancel delay value associated with the third maker order by the third market participant, the third cancel delay value comprising a third amount of time that must pass from the receipt, by the ETV, of a request to cancel the third maker order during which the ETV is prevented from canceling the third maker order, the third amount of time being equal to the second amount of time, determining, by the computer system, that the third cancel delay value is equal to the second cancel delay value; and ranking, by the computer system and in response to the determination that the third cancel delay value is equal to the second cancel delay value, the second maker order ahead of the third maker order based on the second maker order being received by the ETV before the third maker order.

5. The method of claim 1, wherein determining that the first amount of time in the first implicit cancel delay value has not passed comprises:

determining that the current time is within the time of receipt of the first maker order plus the first implicit cancel delay value.

6. The method of claim 1, wherein the maker orders in the maker order queue further comprise a third maker order from a third market participant comprising an order to buy or sell the instrument at the price level, the method further comprising:

obtaining, by the computer system, a third cancel delay value associated with the third maker order by the third market participant, the third cancel delay value comprising a third amount of time that must pass from the receipt, by the ETV, of a request to cancel the third maker order during which the ETV is prevented from canceling the third maker order;

obtaining, by the computer system from the cancel request queue, a third cancellation request from the third market participant that requests cancellation of the third maker order;

identifying, by the computer system, the third maker order as corresponding to the third cancel request and, in response, obtaining a third current time;

determining, by the computer system, that the third amount of time in the third cancel delay value has passed by comparing the third cancel delay value with the amount of time that has passed between the third current time and the time of receipt of the third cancel request by the ETV; and removing, by the computer system, the third maker order from the maker orders queue and the third cancel request from the cancel request queue responsive to determining that the third amount of time in the third cancel delay value has passed.

7. The method of claim 1, the method further comprising:

storing, by the computer system, a predefined cancel delay value for a type of market participant; and determining, by the computer system, that the second market participant comprises the type of market participant;

wherein obtaining the second cancel delay value comprises assigning, by the computer system, the predefined cancel delay value as the second cancel delay value.

8. The method of claim 1, wherein obtaining the second cancel delay value comprises obtaining an implicit cancel delay value set by the second market participant and associating, by the computer system, the implicit cancel delay value with the second maker order.

9. The method of claim 1, wherein obtaining the second cancel delay value comprises:

identifying, by the computer system, the second market participant that submitted the second maker order;

obtaining, by the computer system, a market participant profile of the second market participant; and obtaining, by the computer system, the second cancel delay value from the market participant profile, which pre-specified the second cancel delay value to be used on maker orders from the second market participant.

10. The method of claim 1, wherein the maker orders in the maker order queue further comprise a third maker order sent by a third market participant, the method further comprising:
- identifying, by the computer system, the third market participant;
- determining, by the computer system, that the third market participant is associated with a manual trader;
- obtaining, by the computer system, a predefined cancel delay value that is predefined for manual traders; and
- assigning, by the computer system, the predefined cancel delay value to be used as a third cancel delay value for the third maker order.

11. The method of claim 10, the method further comprising:
- ranking, by the computer system, the third maker order with respect to the first maker order and the second maker order based on the first implicit cancel delay value, the second cancel delay value, and the third cancel delay value such that the first, second, and third maker orders are ranked in order of largest cancel delay value;
- receiving, by the computer system, a request to cancel the third maker order; and
- canceling, by the computer system, the third maker order without the cancel delay period specified by the third cancel value such that the third maker order is ranked based on its the third cancel delay value but not delayed with respect to cancellation.

12. A system of processing maker orders including cancel delay values for execution on an Electronic Trading Venue (ETV), wherein the cancel delay values prevent cancellation of maker orders for a defined time period such that particular maker orders submitted by market participants with network connections with the ETV of a first speed may not be cancelled before completion of a matching operation with taker orders submitted by market participants with network connections with the ETV of a second speed slower than the first speed, and maker orders with cancel delay values of a first value are prioritized over maker orders with cancel delay values of a second value less than the first value to incentivize the use of the larger cancel delay values and increase the fairness and systemic efficiency of the ETV, the system comprising:
- a computer system comprising one or more physical processors programmed with computer program instructions that, when executed by the one or more physical processors, program the computer system to:
  - store a first implicit cancel delay value associated with a first market participant
  - receive a plurality of messages from market participants;
  - add a timestamp to individual messages of the plurality of messages indicating a time of receipt of the individual messages by the ETV;
  - analyze the format of the individual messages of the plurality of messages and classify, based on their format, the individual messages as a maker order, a taker order, or a cancel request message;
  - add maker orders to a maker order queue, taker orders to a taker order queue, and cancel requests to a cancel request queue, the maker orders comprising a first maker order sent by a first market participant comprising an order to buy or sell an instrument at a price level and a second maker order sent by a second market participant comprising an order to buy or sell the instrument at the price level;
  - order the maker order queue, taker order queue, and cancel request queue by the time of receipt by the ETV of the maker orders, taker orders, and cancel requests, respectively;
  - determine whether the first maker order includes a first explicit cancel delay value:
  - obtain, based on the determination that the first maker order does not include a first explicit cancel delay value, the first implicit cancel delay value, and associating the first implicit cancel delay value to the first maker order, the first implicit cancel delay value comprising a first amount of time that must pass from the receipt, by the ETV, of a request to cancel the first maker order during which the ETV is prevented from canceling the first maker order;
  - obtain, from the cancel request queue, a first cancel request from the first market participant that requests cancellation of the & first maker order for the instrument;
  - identify the first maker order as corresponding to the first cancel request and, in response, obtain a current time;
  - determine that the first amount of time in the first implicit cancel delay value has not passed by comparing the first implicit cancel delay value with the amount of time that has passed between the current time and the time stamp added to the first cancel request indicating the time of receipt of the first cancel request by the ETV;
  - prevent, in response to the determination that the first amount of time in the first implicit cancel delay value has not passed, the first maker order from being cancelled at the current time;
  - obtain a second cancel delay value associated with the second maker order by the second market participant, the second cancel delay value comprising a second amount of time that must pass from the receipt, by the ETV, of a request to cancel the second maker order during which the ETV s prevented from canceling the second maker order, the second amount of time being different than the first amount of time of the first cancel delay value associated with the first maker order;
  - determine that the second cancel delay value is larger than the first implicit cancel delay value;
  - rank, in response to the determination that the second cancel delay value is larger than the first implicit cancel delay value, the second maker order ahead of the first maker order;
  - obtain, from the taker order queue, a taker order for the instrument; and
  - select, in response to the ranking of the second maker order ahead for the first maker order, the second maker order to be matched with the taker order for execution despite the ordering of the first and second maker orders in the maker order queue.

13. The system of claim 12, wherein a cancel delay value of a maker order comprises one of a set of permissible cancel delay values predefined by the ETV and the messages received by the computer system further comprise a third maker order from a third market participant, and wherein the computer system is further programmed to:
- obtain a third cancel delay value associated with the third maker order by the third market participant, the third cancel delay value comprising a third amount of time that must pass from the receipt, by the ETV, of a request to cancel the third maker order during which the ETV is prevented from canceling the third maker order, wherein the third cancel delay value is set by the third market participant before the third maker order is received by the ETV;
determine that the third cancel delay value is not one of the predefined set of permissible cancel delay values; and
reject the third maker order based on the third cancel delay value not being one of the predefined set of permissible cancel delay values.

14. The system of claim 12, wherein a cancel delay value of a maker order comprises values below a maximum cancel delay value predefined by the ETV and the messages received by the computer system further comprise a third maker order from a third market participant, and wherein the computer system is further programmed to:
obtain a third cancel delay value associated with the third maker order by the third market participant, the third cancel delay value comprising a third amount of time that must pass from the receipt, by the ETV, of a request to cancel the third maker order during which the ETV is prevented from canceling the third maker order, wherein the third cancel delay value is set by the third market participant before the third maker order is received by the ETV;
determine that the third cancel delay value exceeds the predefined maximum cancel delay value; and
reject the third maker order based on the third cancel delay value not being below the predefined maximum cancel delay value.

15. The system of claim 12, wherein the maker orders in the maker order queue further comprise a third maker order from a third market participant comprising an order to buy or sell the instrument at the price level, the third maker order received by the ETV after the second market order, and the computer system is further programmed to:
obtain a third cancel delay value associated with the third maker order by the third market participant, the third cancel delay value comprising a third amount of time that must pass from the receipt, by the ETV, of a request to cancel the third maker order during which the ETV is prevented from canceling the third maker order, the third amount of time being equal to the second amount of time,
determine that the third cancel delay value is equal to the second cancel delay value; and
ranking, by the computer system and in response to the determination that the third cancel delay value is equal to the second cancel delay value,
the second maker order ahead of the third maker order based on the second maker order being received by the ETV before the third maker order.

16. The system of claim 12, wherein to determine that the first amount of time in the first implicit cancel delay value has not passed, the computer system is further programmed to:
determine that the current time is within the time of receipt of the first maker order plus the first implicit cancel delay value.

17. The system of claim 12, wherein the maker orders in the maker order queue further comprise a third maker order from a third market participant comprising an order to buy or sell the instrument at the price level, and the computer system is further programmed to:
obtain a third cancel delay value associated with the third maker order by the third market participant, the third cancel delay value comprising a third amount of time that must pass from the receipt, by the ETV, of a request to cancel the third maker order during which the ETV is prevented from canceling the third maker order;
obtain, from the cancel request queue, a third cancellation request from the third market participant that requests cancellation of the third maker order;
identify the third maker order as corresponding to the third cancel request and, in response, obtaining a third current time;
determine that the third amount of time in the third cancel delay value has passed by comparing the third cancel delay value with the amount of time that has passed between the current time and the time of receipt of the third cancel request by the ETV; and
remove the third maker order from the maker orders queue and the third cancel request from the cancel request queue responsive to determining that the third amount of time in the third cancel delay value has passed.

18. The system of claim 12, wherein the computer system is further programmed to:
store a predefined cancel delay value for a type of market participant; and
determine that a the second market participant comprises the first type of market participant;
wherein obtaining the second cancel delay value comprises assigning the predefined cancel delay value as the second cancel delay value.

19. The system of claim 12, wherein to obtain the second cancel delay value, the computer system is further programmed to obtain an implicit cancel delay value set by the second market participant and associating the implicit cancel delay value with the second maker order.

20. The system of claim 12, wherein to obtain the second cancel delay value, the computer system is further programmed to:
identify & the second market participant that submitted the second maker order;
obtain a market participant profile of the second market participant; and
obtain the second cancel delay value from the market participant profile, which pre-specified the second cancel delay value to be used on maker orders from the second market participant.

21. The system of claim 12, wherein the maker orders in the maker order queue further comprise a third maker order sent by a third market participant, and the computer system is further programmed to:
identify the third market participant;
determine that the third market participant is associated with a manual trader;
obtain a predefined cancel delay value that is predefined for manual traders; and
assign the predefined cancel delay value to be used as a third cancel delay value for the third maker order.

22. The system of claim 21, wherein the computer system is further programmed to:
rank the third maker order with respect to the first maker order and the second maker order based on the first implicit cancel delay value, the second cancel delay value, and the third cancel delay value such that the first, second, and third maker orders are ranked in order of largest cancel delay value;
receive a request to cancel the third maker order; and
cancel the third maker order without the cancel delay period specified by the third cancel value such that the third maker order is ranked based on its the third cancel delay value but not delayed with respect to cancellation.

23. The method of claim 1, wherein the ranking of at least the first maker and the second maker order comprises a ranking of pending maker orders to buy or sell the instrument at the price level when the taker order is to be matched with a maker order for execution.

24. The system of claim 12, wherein the ranking of at least the first maker and the second maker order comprises a ranking of pending maker orders to buy or sell the instrument at the price level when the taker order is to be matched with a maker order for execution.

25. The method of claim 1, wherein:
the second maker order comprises the second cancel delay value when the second maker order is received by the computer system; and
obtaining the second cancel delay value comprises extracting the second cancel delay value from the second maker order.

26. The method of claim 1, the method further comprising:
storing, by the computer system, second implicit cancel delay values for the second market participant; and
wherein obtaining the second cancel delay value comprises equating the second cancel delay value with the second implicit cancel delay value.

27. The system of claim 12, wherein:
the second maker order comprises the second cancel delay value when the second maker order is received by the computer system; and
obtaining the second cancel delay value comprises extracting the second cancel delay value from the second maker order.

28. The system of claim 12, wherein:
the computer system is further programmed to store second implicit cancel delay values for the second market participant; and
obtaining the second cancel delay value comprises equating the second cancel delay value with the second implicit cancel delay value.

* * * * *